(12) United States Patent
Chen et al.

(10) Patent No.: US 9,076,497 B1
(45) Date of Patent: Jul. 7, 2015

(54) ELECTRONIC DEVICE WITH DISK DRIVE MOUNTING ASSEMBLY

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Ching-Jou Chen, New Taipei (TW); Chien-Min Hung, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/475,782

(22) Filed: Sep. 3, 2014

(51) Int. Cl.
*G11B 33/02* (2006.01)

(52) U.S. Cl.
CPC ...................... *G11B 33/02* (2013.01)

(58) Field of Classification Search
USPC .......................... 720/610, 639, 657, 672, 673
See application file for complete search history.

(56) References Cited

U.S. PATENT DOCUMENTS

| | | | | |
|---|---|---|---|---|
| 6,299,266 | B1 * | 10/2001 | Justice et al. | 312/223.2 |
| 6,304,457 | B1 * | 10/2001 | Liu et al. | 361/799 |
| 6,954,940 | B2 * | 10/2005 | Hsu | 720/639 |
| 7,180,734 | B2 * | 2/2007 | Jing | 361/679.33 |
| 8,107,257 | B2 * | 1/2012 | Moorehead et al. | 361/801 |
| 8,310,827 | B2 * | 11/2012 | Huang et al. | 361/679.37 |
| 8,755,178 | B2 * | 6/2014 | Zheng et al. | 361/679.37 |

* cited by examiner

*Primary Examiner* — Brian Miller
*Assistant Examiner* — Carlos E Garcia
(74) *Attorney, Agent, or Firm* — Novak Druce Connolly Bove + Quigg LLP (57) ABSTRACT

A disk drive mounting assembly is configured to mount a disk drive. The disk drive mounting assembly can include a carrier configured to receive a disk drive and a retainer configured to be coupled to the disk drive and retain the disk drive in the carrier. The retainer can include a main body, a head extending from the main body, and two wings extending from two opposite sides of the main body and configured to be coupled to the disk drive. The head has a distal end spaced from the main body and the wings. The head has a distal end moving toward the main body when the head is pressed, and has the end moving away from the main body retain the disk drive in the carrier when the head is released.

18 Claims, 7 Drawing Sheets

ELECTRONIC DEVICE WITH DISK DRIVE MOUNTING ASSEMBLY

FIELD

The present disclosure relates to disk drive mounting assemblies in electronic devices, and more particularly to a disk drive mounting assembly convenient for users to mount or remove a disk drive in an electronic device.

BACKGROUND

Today, computers and computer servers have become one of the requisite implements in factories, offices, schools, as well as homes. In order to minimize space occupation, internal parts of the computers or computer servers are arranged in high density. Disk drives such as hard disk drives or optical disk drives are generally needed to be mounted in or removed from the computers or computer servers.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure is described in relation to a disk drive mounting assembly configured to mount a disk drive. The disk drive mounting assembly can include a carrier configured to receive a disk drive and a retainer configured to be coupled to the disk drive and retain the disk drive in the carrier. The retainer can include a main body, a head extending from the main body, and two wings extending from two opposite sides of the main body and configured to be coupled to the disk drive. The head has an end spaced from the main body and the wings. The end of the head is configured to move toward the main body when the head is pressed, and configured to move away from the main body to retain the disk drive in the carrier when the head is released.

The present disclosure is further described in relation to an electronic device including a disk drive, a carrier including a case configured to receive the disk drive, and a retainer coupled to the disk drive and configured to retain the disk drive in the carrier. The retainer can include a main body, a head extending from the main body, and two wings extending from two opposite sides of the main body and coupled to the disk drive. The head can have an end spaced from the main body and the wings. The end of the head is configured to move toward the main body when the head is pressed, and configured to move away from the main body to abut against the carrier to retain the disk drive in the carrier when the head is released.

Figure 1:
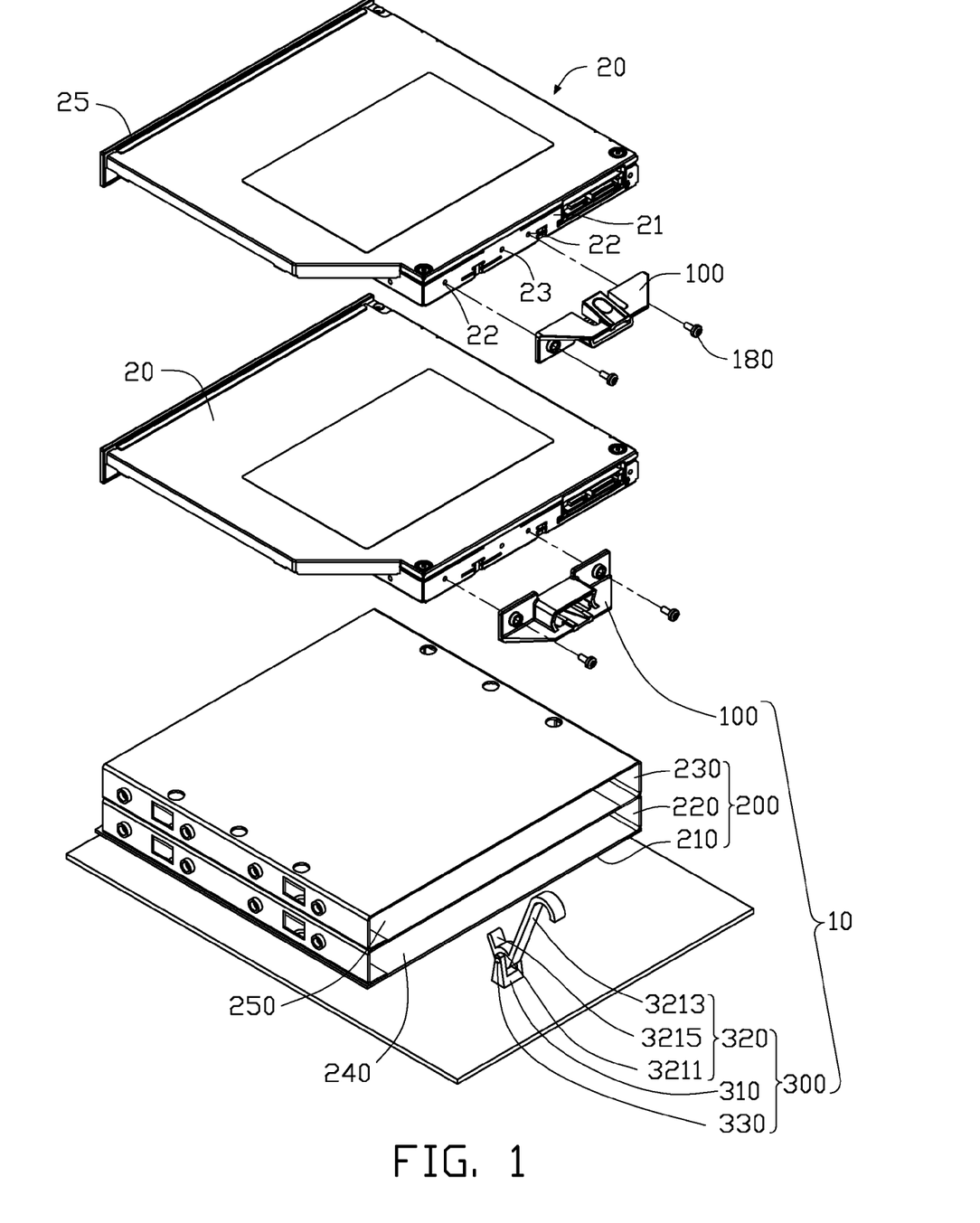
FIG. 1 is an exploded, isometric view of a disk drive mounting assembly with a disk drive in accordance with a first embodiment of the present disclosure.

Referring to FIG. 1, a disk drive mounting assembly 10 of an embodiment of the present disclosure is illustrated. The disk drive mounting assembly 10 can be used for mounting hard disk drives, optical disk drives or other electronic members. In this embodiment, the disk drive mounting assembly 10 is used for mounting optical disk drives 20. The disk drive mounting assembly 10 can include a carrier 200 configured to receive one or more receiving optical disk drive 20, and one or more retainer 100 configured to retain the optical disk drive 20 with the carrier 200.

In this embodiment, the carrier 200 is configured to receive two optical disk drives 20. The carrier 200 includes a base 210 and a first cover 220 located on the base 210. The base 210 and the first cover 220 cooperatively form a first case 240 for receiving one of the optical disk drives 20. The carrier 200 further includes another second cover 230 stacked on the first cover 220. The second cover 230 and the first cover 220 cooperatively form a second case 250 for receiving other optical disk drives 20.

Figure 2:
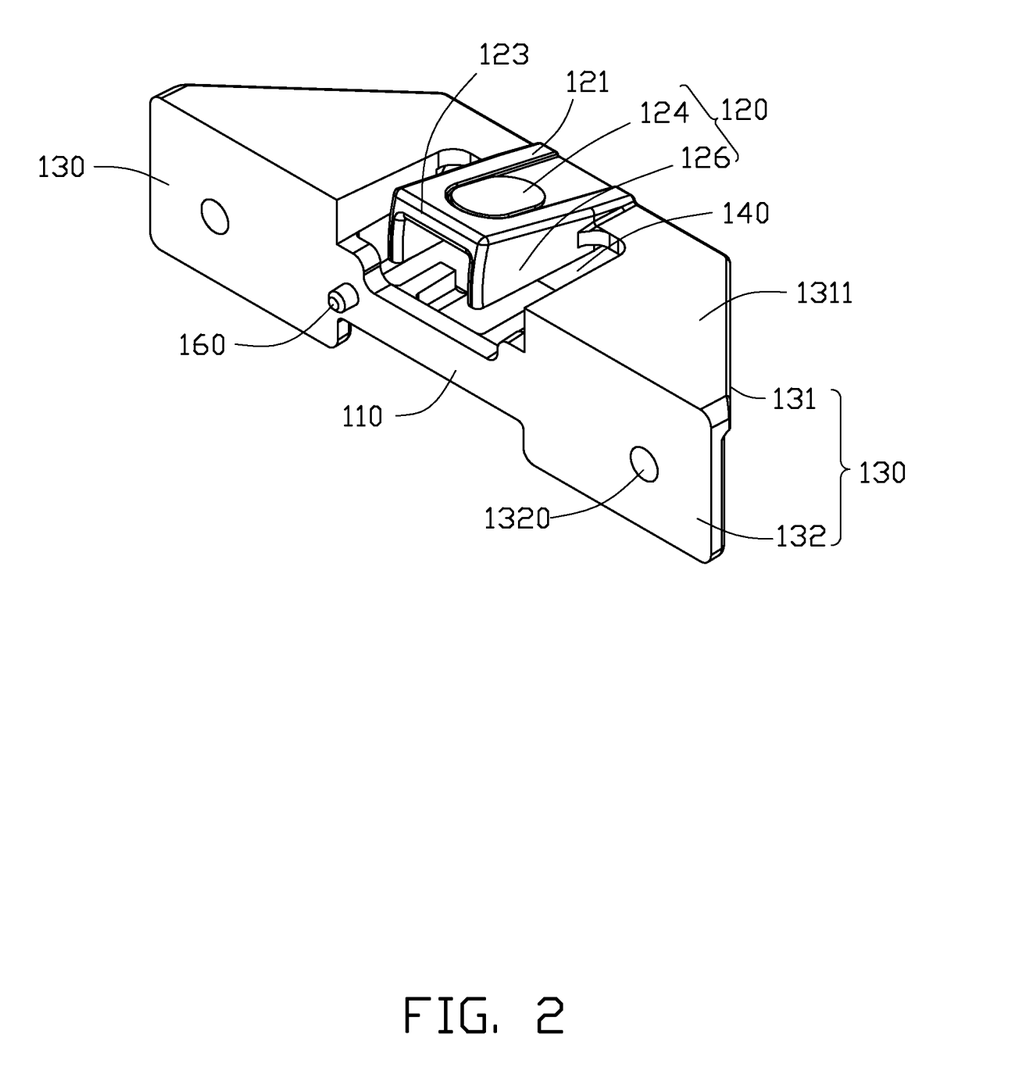
FIG. 2 is an enlarged, isometric view of a retainer of the disk drive mounting assembly in FIG. 1.

Referring to FIG. 2 also, in this embodiment, the disk drive mounting assembly 10 includes two retainers 100 corresponding to the two optical disk drives 20. Each retainer 100 can include a main body 110, a head 120 extending from the main body 110, and two wings 130 extending from two opposite sides of the main body 110.

The main body 110 defines a hollow 140 between the two wings 160. The head 120 has a proximal first end 121 attached extending from the main body 110 and a distal second end 123 extending from the first end 121 and corresponding to the hollow 140. The second end 123 is spaced, and tilted away from the main body 110 and the two wings 130 by the hollow 140. The second end 123 can move toward the main body 110 to be received in the hollow 140 by pressing, and the second end 123 can move away from the main body 110 to have at least a part of the second end 123 protruding out of the hollow 140 by releasing. In detail, the head 120 can include a face portion 124 and two side portions 126 extending from two opposite sides of the face portion 124. The face portion 124 and the two side portions 126 are coupled to the main body 110 at the first end 121, correspond to the hollow 140, and are tilted upward and away the main body 110 at the second end 123. The face portion 124 is completely located outside the hollow 140. The two side portions 126 have lower portions thereof received in the hollow 140. The two side portions 126 are substantially parallel to each other, and substantially perpendicular to the face portion 124.

The two wings 130 each can include a wing portion 131 and a coupling portion 133 extending from the wing portion 131. The wing portion 131 can be substantially perpendicular to the coupling portion 133. The wing portion 131 has a flat face 1311. The coupling portion 132 can define a through hole 1320 configured to receive a bolt 180. A protrusion 160 can extend outwardly from a joint of the main body 110 and one of the two wings 130 for coupling to the optical disk drive 20.

The disk drive mounting assembly 10 can further include an operating device 300 corresponding to the face portion 124 of one of the two retainers 100. The operating device 300 can include a support 310 and a rotating member 320 rotatably coupled to the support 310 via a pivot 330 coupled to the support 310 and the rotating member 320. The support 310 can be coupled to a wall 30 which can be a part of a case of a computer. The rotating member 320 can include a wheel portion 3211 coupled to the support 310 via the pivot 330, a handle portion 3213 extending from a periphery of the wheel portion 3211, and a finger portion 3215 extending from the periphery of the wheel portion 3211 toward the face portion 124 of the corresponding retainer 100.

Referring back to FIG. 1, the optical disk drive 20 has a side face 21 defining two spaced apertures 22 corresponding to the through holes 1320 of the retainer 100. The side face 21 further defines a receiving hole 23 configured to receive the protrusion 160 of the retainer 100. The optical disk drive 20 can further have a blocking face 25 opposite to the side face 21.

Figure 3:
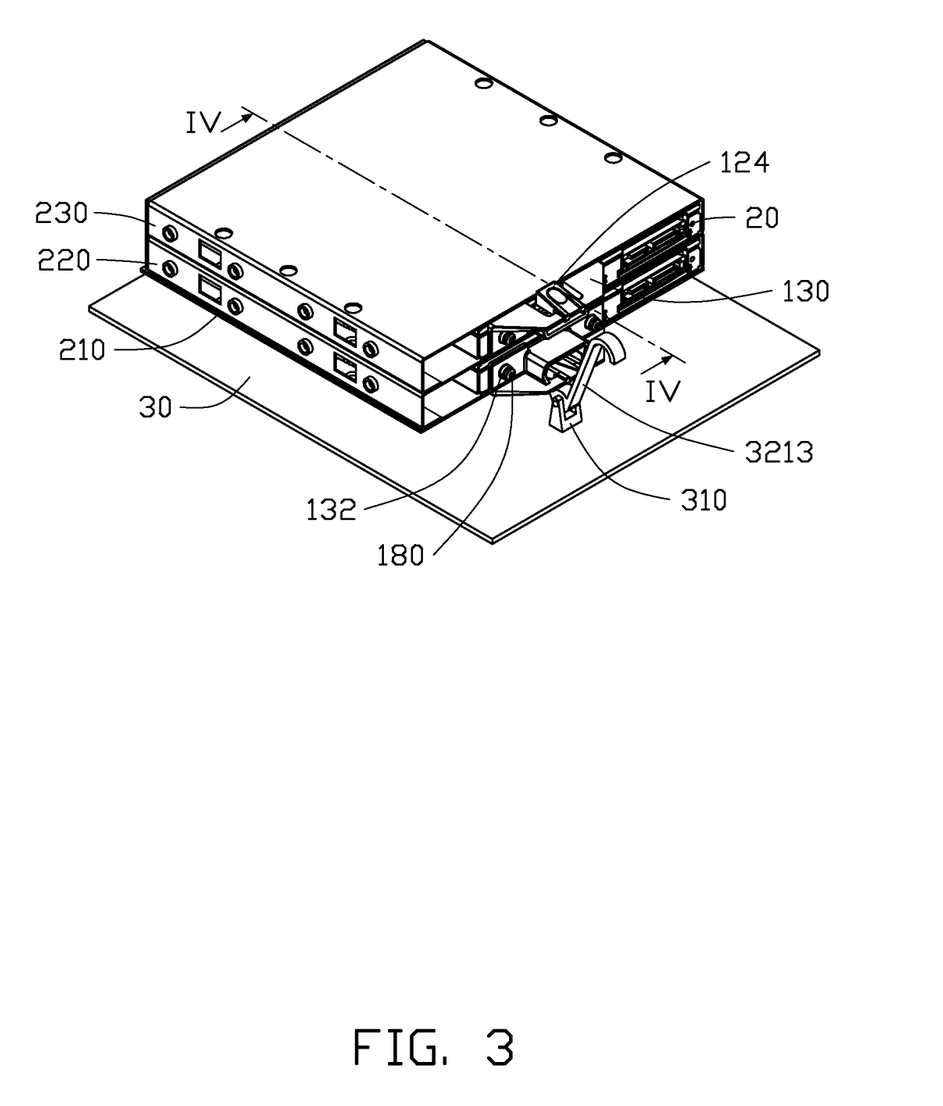
FIG. 3 is an assembled, isometric view of the disk drive mounting assembly and the disk drive in FIG. 1.
Figure 4:
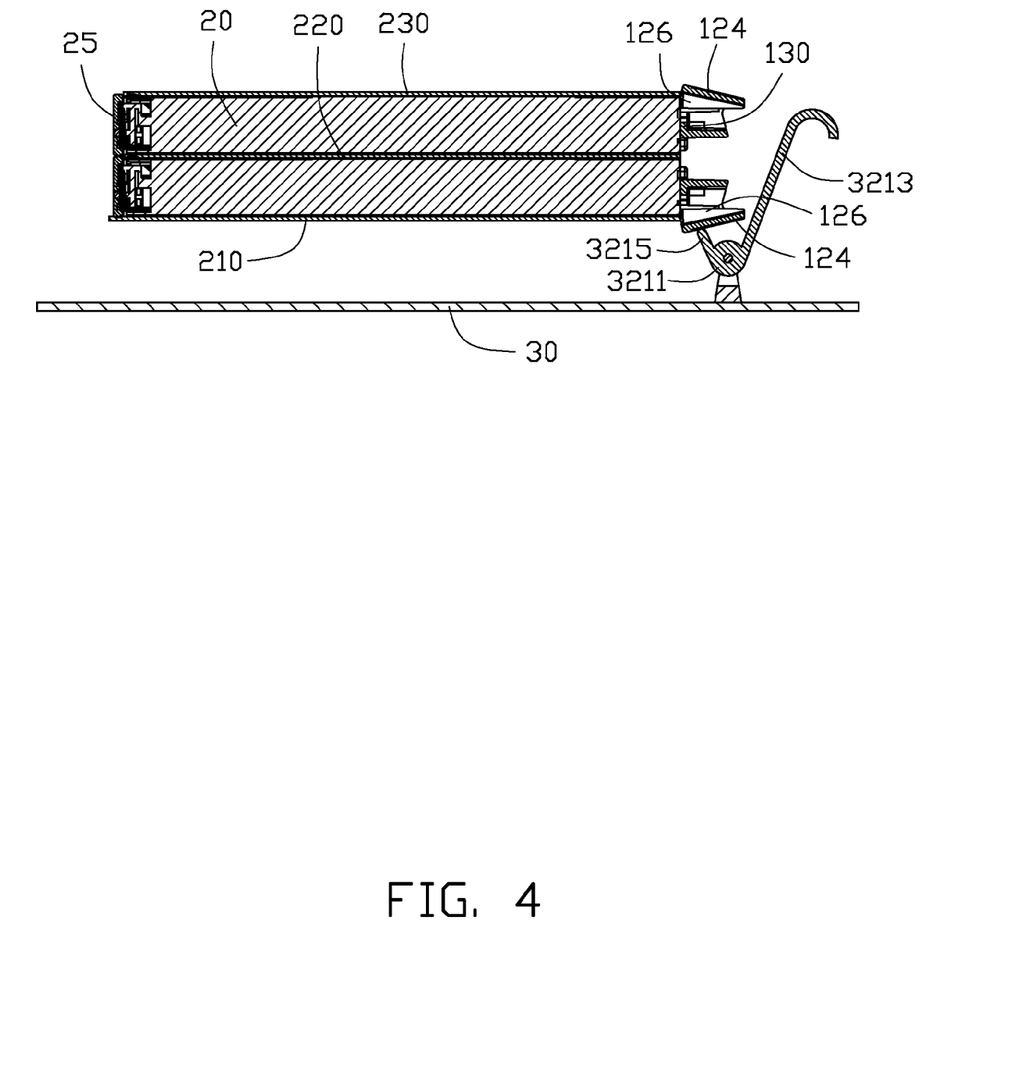
FIG. 4 is a cross-sectional view of the disk drive mounting assembly and the disk drive in FIG. 3 taken along a line IV-IV, wherein the retainer is in a locked state.

Referring to FIG. 3 and FIG. 4, when mounting the optical disk drives 20 into the carrier 200, the protrusion 160 of the retainer 100 is inserted into the receiving hole 23 of the optical disk drive 20. The coupling portions 132 of the wings 130 of the retainer 100 contact the side face 21 of the optical disk drive 20, the through holes 1320 correspond to the apertures 22 of the optical disk drive 20. The bolts 180 are engaged in the through holes 1320 and the apertures 22, thereby retaining the retainer 100 to the optical disk drive 20. The optical disk drives 20 with the retainers 100 are inserted into the first case 240 and the second case 250 respectively. The head 120 of the retainer 100 is pressed by a corresponding one of the first cover 220 and the second cover 230, the second end 123 of the head 120 is moved toward the main body 110 of the retainer 100 to be received in the hollow 140 of the main body 110, until the retainer 100 passes through the corresponding one of the first cover 220 and the second cover 230 and is released by the corresponding one of the first cover 220 and the second cover 230. The head 120 is elastically recovered and has the second end 123 moving away from the main body 110, the second end 123 has at least a part thereof protrude out of the hollow 140. The head 120 has the second end 123 abutting against the side face 21 and an end of the carrier 200 to retain the optical disk drive 20 in the carrier 200. Here, the retainer 100 is in a locked state. In detail, for the optical disk drive 20 in the first case 240, the head 120 has the side portions 126 at the second end 123 abutting against the side face 21 and an end of the base 210, the face portion 124 at the second end 123 is located beyond the base 210 along a stacked direction of the two optical disk drives 20, and the finger portion 3215 of the operating device 300 corresponds to the face portion 124 of the head 120. For the optical disk drive 20 in the second case 250, the head 120 has the side portions 126 at the second end 123 abutting against the side face 21 and an end of the second cover 230, the face portion 124 at the second end 123 is located beyond the second case 250 along the stacked direction of the two optical disk drives 20. The optical disk drives 20 can further have the blocking faces 25 blocked at an opposite end of the carrier 200 to prevent the optical disk drives 20 from being dropped from the end of the carrier 200.

Figure 5:
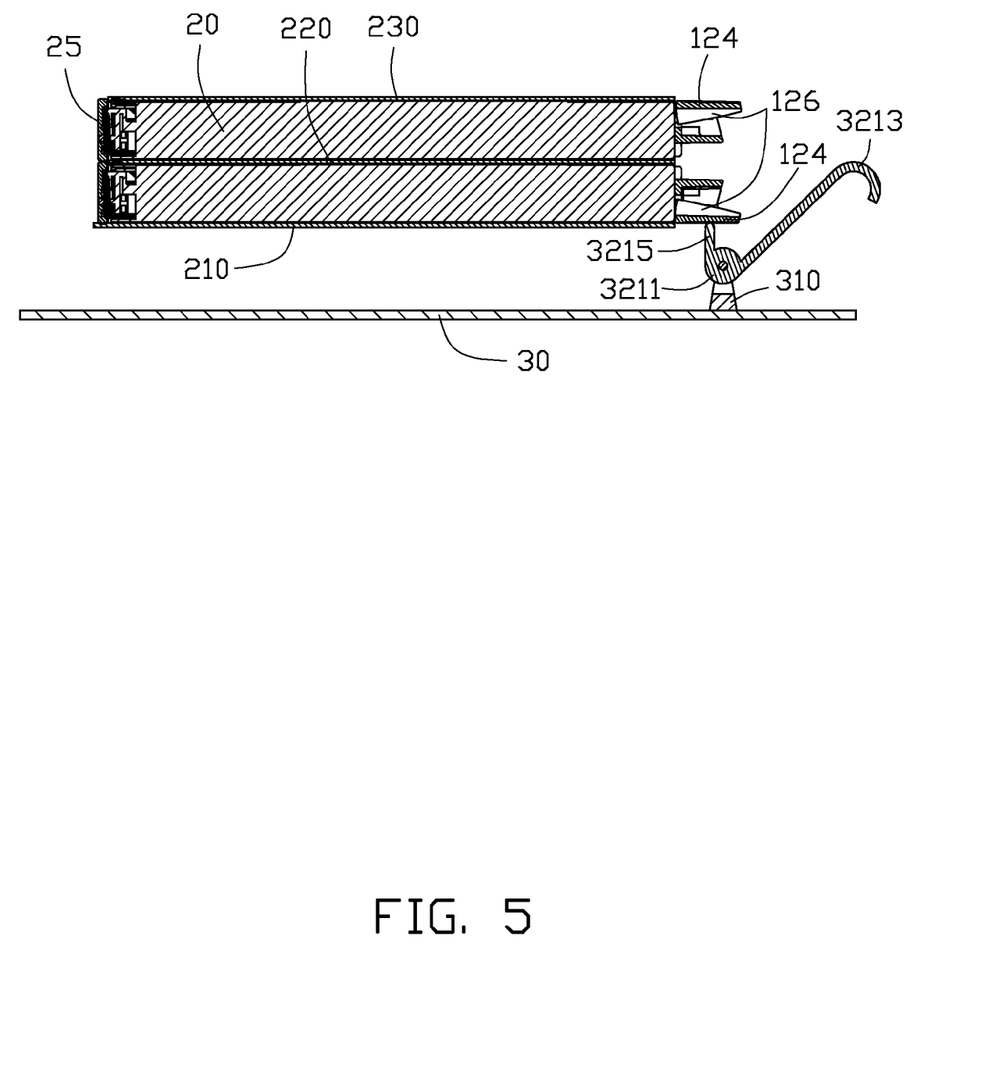
FIG. 5 is another cross-sectional view of the disk drive mounting assembly and the disk drive in FIG. 3 taken along a line IV-IV, wherein the retainer is in an unlocked state.
Figure 6:
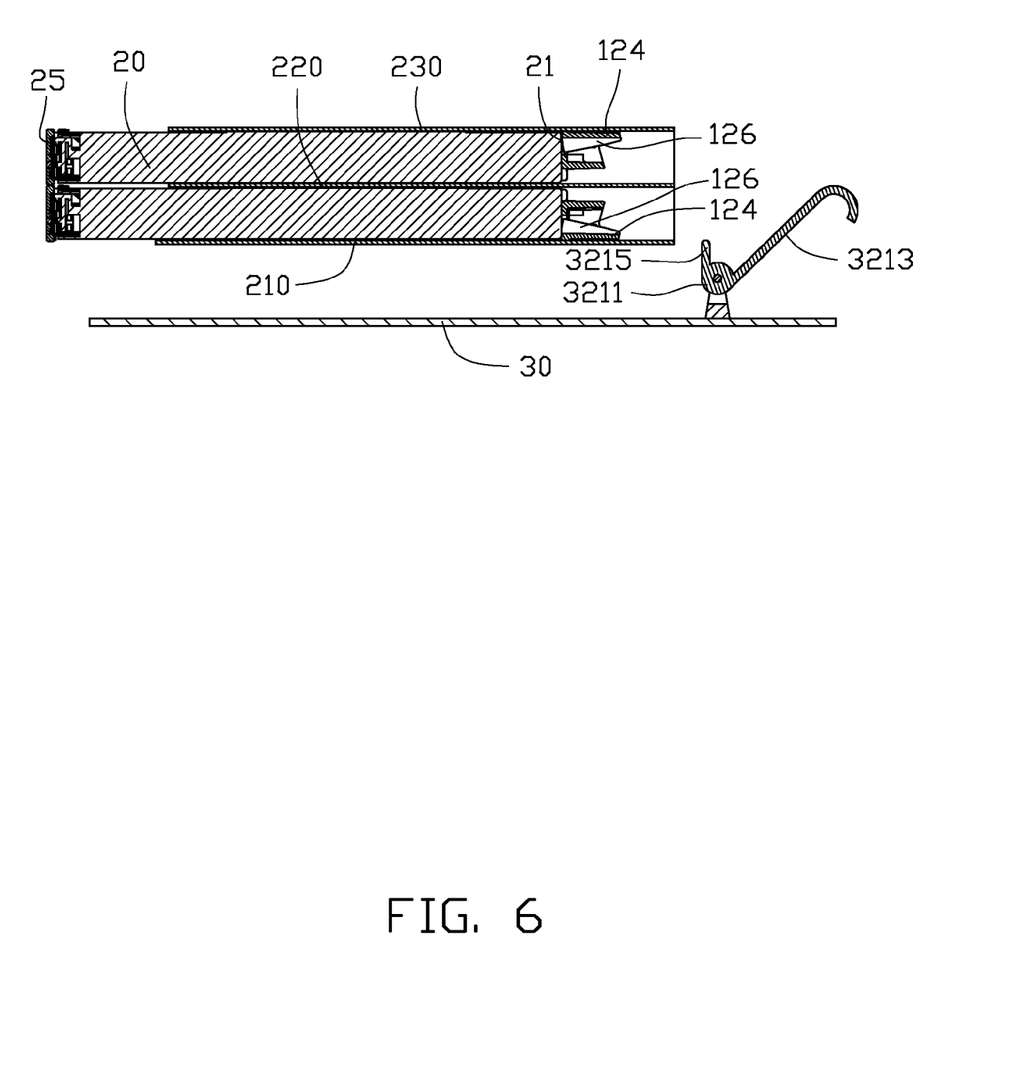
FIG. 6 is additional cross-sectional view of the disk drive mounting assembly and the disk drive in FIG. 3 taken along a line IV-IV, wherein the retainer in another unlocked state.

Referring to FIG. 5 and FIG. 6, when removing the optical disk drive 20 from the second case 250 of the carrier 200, the face portion 124 of the head 120 at the second end 123 is pressed to move toward the main body 110 of the retainer 100 by a finger of a user or a tool. The head 120 has the second end 123 received in the hollow 140. The face portion 124 goes into the second case 250 and is pressed by the second cover 230. The optical disk drives 20 can be released from the carrier 200, here, the retainer 100 is in an unlocked state.

When removing the optical disk drive 20 from the first case 240 of the carrier 200, the handle portion 3213 of the operating device 300 is operated to drive the finger portion 3215 of the operating device 300 to press the face portion 124 toward the main body 110. The head 120 has the second end 123 received in the hollow 140. The face portion 126 goes into the first case 240 and is pressed by the base 210, and the optical disk drives 20 can be released from the carrier 200.

Figure 7:
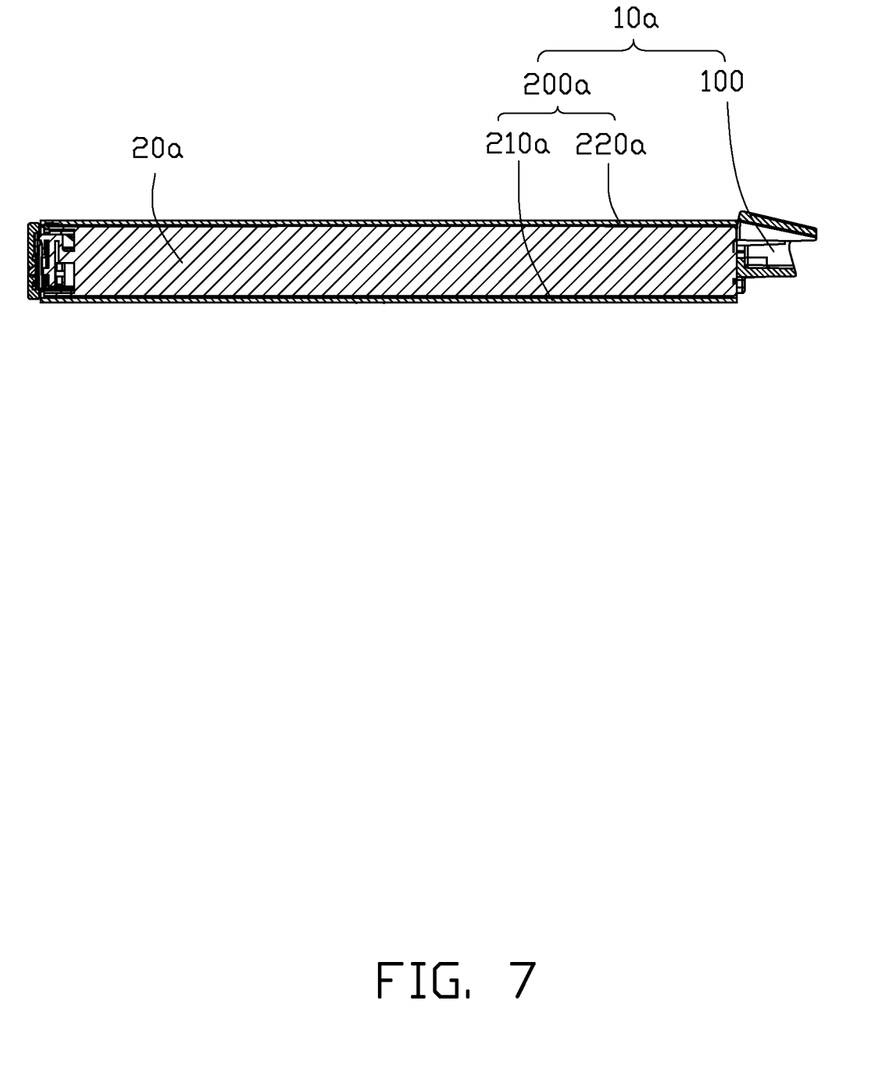
FIG. 7 is a cross sectional view of a disk drive mounting assembly with a disk drive in accordance with a second embodiment of the present disclosure.

Referring to FIG. 7, a disk drive mounting assembly 10a with a disk drive 20a in accordance with a second embodiment of the present disclosure is illustrated. The difference between the disk drive mounting assembly 10a and the disk drive mounting assembly 10 is that the disk drive mounting assembly 10a can include one retainer 100 and a carrier 200a configured to mount one optical disk drive 20a. The carrier 200a can has one case which is cooperatively formed by a base 210a and a cover 220a. The operating device 300 and the wall 30 in the disk drive mounting assembly 10 can be omitted in the disk drive mounting assembly 10a.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:
1. A disk drive mounting assembly comprising:
a carrier comprising a case shaped to receive a disk drive; and
a retainer configured to be attached to an end of the disk drive and retain the disk drive in the carrier, the retainer comprising a main body, a head extending from the main body, and two wings extending from two opposite sides of the main body and configured to be coupled to the disk drive, the head having a distal end spaced from the main body and the wings;
wherein the distal end moves toward the main body when the head is pressed for insertion of the disk drive in the carrier, and after the insertion, the distal end moves away from the main body to abut against the carrier to retain the disk drive in the carrier when the head is released.

2. The disk drive mounting assembly of claim 1, wherein the main body defines a hollow, the distal end spaced from the main body and the wings by the hollow.

3. The disk drive mounting assembly of claim 2, wherein the distal end moving toward the main body to be received in the hollow when the head is pressed, and has at least a part of the distal end protruding out of the hollow when the head is released.

4. The disk drive mounting assembly of claim 3, wherein the head has a first end opposite to the distal end, the first end of the head attached to and extending from the main body, the distal end of the head being tilted away the main body.

5. The disk drive mounting assembly of claim 4, wherein the head abuts against one end of the carrier when the head is released.

6. The disk drive mounting assembly of claim 5, wherein the head comprises a face portion and two side portions extending from two opposite sides of the face portion, the side portions at the distal end of the head abutting against the end of the carrier when the head is released.

7. The disk drive mounting assembly of claim 3, wherein the wings each comprise a coupling portion configured to be coupled to the disk drive.

8. The disk drive mounting assembly of claim 7, wherein the retainer further comprises a protrusion configured to be inserted into the disk drive.

9. The disk drive mounting assembly of claim 1 further comprising an additional retainer, wherein the carrier further comprises an additional case configured to receive an additional disk drive, the additional retainer having a structure same as that of the retainer and retaining the additional disk drive in the carrier.

10. The disk drive mounting assembly of claim 9 further comprising an operating device configured to press the additional retainer.

11. The disk drive mounting assembly of claim 10, wherein the operating device comprises a support and a rotating member rotatably coupled to the support via a pivot coupled to the support and the rotating member.

12. The disk drive mounting assembly of claim 11, wherein the rotating member includes a wheel portion coupled to the support via the pivot, a handle portion extending from a periphery of the wheel portion, and a finger portion extending from the periphery of the wheel portion toward the additional retainer.

13. An electronic device comprising:
a disk drive;
a carrier comprising a case shaped to receive the disk drive; and
a retainer coupled to the disk drive and configured to retain the disk drive in the carrier, the retainer comprising a main body, a head extending from the main body, and two wings extending from two opposite sides of the main body and coupled to the disk drive, the head having a distal end spaced from the main body and the wings;
wherein the distal end moves toward the main body when the head is pressed for insertion of the disk drive in the carrier, and the distal end moves away from the main body to abut against the carrier to retain the disk drive in the carrier when the head is released.

14. The electronic device of claim 13, wherein the main body defines a hollow, the head having the distal end spaced from the main body and the wings by the hollow.

15. The electronic device of claim 14, wherein the distal end moves toward the main body to be received in the hollow when the head is pressed, and has at least a part of the distal end protruding out of the hollow when the head is released.

16. The electronic device of claim 15, wherein the head has a first end opposite to the distal end, the first end of the head extending from the main body, the distal end of the head being tilted away the main body.

17. The electronic device of claim 15 further includes an operating device configured to press the end of the head of the retainer.

18. The electronic device of claim 17, wherein the operating device comprises a finger portion corresponding to the distal end of the head, and a handle portion configured to drive the finger portion to press the distal end of the head.

* * * * *